United States Patent
Schrad et al.

(10) Patent No.: US 11,806,698 B2
(45) Date of Patent: Nov. 7, 2023

(54) SYSTEM FOR IONIC LIQUID CATALYST REGENERATION

(71) Applicant: UOP LLC, Des Plaines, IL (US)

(72) Inventors: Gregory J. Schrad, Naperville, IL (US); Eric Leeton, Des Plaines, IL (US); Rebecca Mudrock, Wauconda, IL (US)

(73) Assignee: UOP LLC, Des Plaines, IL (US)

( * ) Notice: Subject to any disclaimer, the term of this patent is extended or adjusted under 35 U.S.C. 154(b) by 152 days.

(21) Appl. No.: 17/245,475

(22) Filed: Apr. 30, 2021

(65) Prior Publication Data
US 2021/0339236 A1 Nov. 4, 2021

Related U.S. Application Data

(60) Provisional application No. 63/018,874, filed on May 1, 2020.

(51) Int. Cl.
*B01J 31/40* (2006.01)
*B01J 8/02* (2006.01)
(Continued)

(52) U.S. Cl.
CPC .............. *B01J 31/40* (2013.01); *B01J 8/0242* (2013.01); *B01J 19/1818* (2013.01);
(Continued)

(58) Field of Classification Search
CPC ...... B01J 8/0242; B01J 8/0446; B01J 8/0449; B01J 8/0453; B01J 8/0457; B01J 19/1818; B01J 19/1825; B01J 31/40
See application file for complete search history.

(56) References Cited

U.S. PATENT DOCUMENTS 3,301,909 A * 1/1967 Kawasaki et al. .... C07C 29/141
568/881
4,312,741 A * 1/1982 Jacquin .................. C10G 45/18
208/143

(Continued)

FOREIGN PATENT DOCUMENTS

| SU | 1593696 A1 | 9/1990 |
|---|---|---|
| WO | 2004037950 A1 | 5/2004 |
| WO | 2015026393 A1 | 2/2015 |

OTHER PUBLICATIONS

Notification of Transmittal of the International Search Report and the Written Opinion of the International Searching Authority for corresponding PCT application No. PCT/US2021/030072 dated Aug. 5, 2021.

*Primary Examiner* — Lessanework Seifu

(57) ABSTRACT

Systems, reactors, and processes for regenerating ionic liquid using catalyst. A plurality of tubular reactors are provided having a first end and a second end and catalyst particles disposed in the tubular reactor between the first end and the second end. A line supplies separated ionic liquid catalyst to the first end of the tubular reactor. Hydrogen is also supplied. Regenerated ionic liquid catalyst is recovered from the second end of the tubular reactor. The inner surface of the tubular reactor is preferably non-corrosive or non-reactive. A fluoropolymer lining may be used. The tubular reactors are modular, and may be changed out with the catalyst inside when the catalyst are to be replaced.

19 Claims, 5 Drawing Sheets

(51) Int. Cl.
*B01J 19/18* (2006.01)
*B01J 38/10* (2006.01)
*B01J 31/02* (2006.01)

(52) U.S. Cl.
CPC ....... *B01J 19/1825* (2013.01); *B01J 31/0277* (2013.01); *B01J 38/10* (2013.01)

(56) References Cited

U.S. PATENT DOCUMENTS

| | | |
|---|---|---|
| 7,651,970 B2 | 1/2010 | Elomari et al. |
| 7,691,771 B2 | 4/2010 | Harris et al. |
| 7,732,363 B2 | 6/2010 | Elomari et al. |
| 7,825,055 B2 | 11/2010 | Elomari et al. |
| 8,704,018 B2 * | 4/2014 | Timken .................. C10G 67/04 208/15 |
| 9,802,186 B2 | 10/2017 | Luo et al. |
| 10,005,057 B1 | 6/2018 | Girgis et al. |
| 10,533,141 B2 * | 1/2020 | Moore .................. C10G 45/22 |
| 2011/0137083 A1 * | 6/2011 | Pfeffinger ................ B01J 8/228 564/450 |
| 2013/0041191 A1 * | 2/2013 | Pigamo .................. C07C 17/20 570/160 |
| 2014/0001089 A1 * | 1/2014 | Bazer-Bachi .......... C10G 65/04 208/143 |
| 2014/0056774 A1 | 2/2014 | Kelly et al. |
| 2016/0001255 A1 * | 1/2016 | Luo .......................... B01J 4/004 422/224 |

\* cited by examiner

US 11,806,698 B2

SYSTEM FOR IONIC LIQUID CATALYST REGENERATION

RELATED APPLICATIONS

This application claims priority to U.S. Provisional Patent Application Ser. No. 63/018,874 filed on May 1, 2020, the entirety of which is hereby incorporated by reference.

FIELD OF THE INVENTION

This invention relates generally to ionic liquid regeneration processes, and more specifically to systems for ionic liquid regeneration processes.

BACKGROUND OF THE INVENTION

Commercially, the alkylation of isoparaffins has been catalyzed by acids such as sulfuric acid and hydrofluoric acid. Conjunct polymer (acid soluble oils, (ASO) also known as red oil) forms as a byproduct of the alkylation reaction, as well as other hydrocarbon reactions. When too much conjunct polymer is present, the acid catalyst loses its effectiveness. The acid must be replaced with fresh acid, or the conjunct polymer must be removed in order to reactivate the acid catalyst. With sulfuric acid as the catalyst, the ASO is burned, and with hydrofluoric acid, the hydrofluoric acid is distilled away from the ASO. Sulfuric acid and hydrofluoric acid are hazardous and corrosive, and their use in industrial processes requires a variety of environmental controls.

Recently, there has been a desire to replace the use of sulfuric acid and hydrofluoric acid with more environmentally friendly materials. One such solution utilizes acidic ionic liquids as catalysts in hydrocarbon conversion processes, such as alkylation, isomerization, disproportionation, reverse disproportionation, and oligomerization. The ionic liquid catalysts are more environmentally friendly and therefore, more desirable than the sulfuric acid and hydrofluoric acid.

However, just as with the sulfuric acid and hydrofluoric acid, conjunct polymers are byproducts of the hydrocarbon reactions using ionic liquids. The conjunct polymers form a complex with the ionic liquid. The ionic liquid loses its effectiveness over time as the amount of conjunct polymer increases. Over time, the ionic liquid must then either be replaced or regenerated. Since ionic liquids are typically relatively expensive, efficient and effective processes for regenerating the ionic liquid are desired.

Ionic liquid regeneration processes are known. Current processes for ionic liquid regeneration utilize contacting the ionic liquid with hydrogen, with or without the presence of catalyst, to remove the conjunct polymer from the ionic liquid. In all processes, both the temperature and pressure of the regeneration process significantly influence the rate constant for the regeneration reaction. In the catalyst free process, either high temperatures or high pressures are necessary to facilitate a rate constant that will result in reasonable residence time of the ionic liquid. This may also require high hydrogen flow rates to achieve adequate phase contacting and relatively large volumes of ionic liquid. However higher temperatures, pressures and hydrogen flow rates all pose increased risks for the refinery, so it is desirable to reduce each of these parameters for the regeneration process. Additionally, reducing the required total volume of ionic liquid in the unit is beneficial from a cost stand point. By adding catalyst to the regeneration process, the rate constant may be retained at lower temperature and pressures, greatly reducing the risks and cost to the refinery. It has previously been suggested that the regeneration reaction take place in a large single, catalyst filled reactor. However, it is known that the catalyst and the adsorbent material that protects the catalyst in a guard bed must be replaced regularly. To avoid interruptions in the unit operation during catalyst change out, identical reactors and guard beds are arranged in parallel so that a portion of the regeneration unit can be taken out of service while the remaining portion of the regeneration unit operates to maintain the required CP removal required by the unit operating conditions.

Therefore, there remains a need for a more efficient and cost advantageous systems and process for regenerating ionic liquid at lower temperatures and pressures to reduce potential risks to the refinery.

SUMMARY OF THE INVENTION

The present invention provides effective and efficient systems and process for regenerating ionic liquid which reduce potential risks to the refinery. The regeneration of ionic liquid may be accomplished in tubular reactors which have non-reactive linings, or which have an inner surface (i.e., a surface that is contacted by the ionic liquid) that is a corrosion resistant metal or metal alloy. The tubular reactors may be arranged in series or parallel, or some combination thereof, and have a redundancy such that the regeneration process may continue while a subset of reactors are taken offline for needed maintenance and reloading of solid catalyst. The tubular reactors may be modular in construction allowing for complete removal and drop-in replacement of the reactor and catalyst inside.

Therefore, the present invention may be characterized, in at least one aspect, as providing a system for regenerating ionic liquid with solid regeneration catalyst and hydrogen, the system having: a plurality of tubular reactors, each tubular reactor having a first end and a second end opposite the first end, each tubular reactor comprising a metal material, and each tubular reactor orientated vertically; a first line configured to supply separated ionic liquid to the first ends of the tubular reactors of the plurality of tubular reactors; a solid active particulate material disposed in each of the tubular reactors; a second line configured to recover an effluent from the second ends of the tubular reactors of the plurality of tubular reactors; and, a piping arrangement connecting the plurality of tubular reactors.

Each of the tubular reactors of the plurality of tubular reactors may be modular and configured to be removed from the system and replaced by another tubular reactor.

The tubular reactors of the plurality of tubular reactors may be arranged so that system continues to operate when one or more of the tubular reactors of the plurality of tubular reactors are taken offline.

The tubular reactors of the plurality of tubular reactors may be arranged in series.

The tubular reactors of the plurality of tubular reactors may be arranged in parallel.

The tubular reactors of the plurality of tubular reactors may include tubular reactors arranged in series and tubular reactors arranged in parallel. The system may also include a piping arrangement configured to supply equal flow to the tubular reactors arranged in parallel.

Each of the tubular reactors may include an inner lining formed from a material that is non-reactive with ionic liquid. The material of the inner lining may be selected from the group consisting of: fluoropolymer, fiberglass, epoxy coating, phenolic coating, and, mixtures thereof.

An inner surface of each of the tubular reactors and the connecting piping arrangement may be formed from a metal or metal alloy that resistant to corrosion from ionic liquid.

The solid active particulate material disposed in at least one tubular reactor from the plurality of tubular reactors may be a pretreat catalyst material configured to treat the ionic liquid, with or without the presence of hydrogen. The at least one tubular reactor having the pretreat catalyst material may include a plurality of different pretreat catalyst materials.

The solid active particulate material disposed in at least one tubular reactor from the plurality of tubular reactors may be the solid regeneration catalyst. The at least one tubular reactor having the solid regeneration catalyst may include a plurality of solid regeneration catalysts.

The first ends of the tubular reactors may be at bottoms of the tubular reactors and the second ends of the tubular reactors are at tops of the tubular reactors. Hydrogen may be injected at the first ends of the tubular reactors and recovered in the second line.

The first ends of the tubular reactors may be at tops of the tubular reactors and the second ends of the tubular reactors may be at bottoms of the tubular reactors. Hydrogen may be injected at the second ends of the tubular reactors and recovered in separate outlets at the first ends of each of the tubular reactors.

The system may also include a heat exchanger configured to supply heat to fluid within the tubular reactors.

Each tubular reactor may have a height between 1.5 to 30.4 meters (5 to 100 feet) and a diameter between 25.4 to 305 centimeters (10 to 120 inches).

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION OF THE INVENTION

As mentioned above, there is a need for systems and processes for regenerating ionic liquid which reduce potential risks to the refinery. In various aspects, the present systems and processes solves one or more problems associated with the current systems and processes by using lined piping components to construct a reactor system for the regeneration reaction, using solid catalyst to achieve an acceptable reaction rate constant at a lower operating temperature and pressure, thus lowering the ionic liquid inventory required and reducing the size of the reactor, by having a modular system with the tubular reactors allowing for quick change out of the regeneration catalyst, not requiring catalyst activation step, by having specific designs of guard bed materials, such as Catrap or pretreat catalyst, to capture corrosive metal chlorides from the reactor section and extend the runtime of the regeneration catalyst, or by a combination of the foregoing solutions.

With these general principles in mind, one or more embodiments of the present invention will be described with the understanding that the following description is not intended to be limiting.

Figure 1:
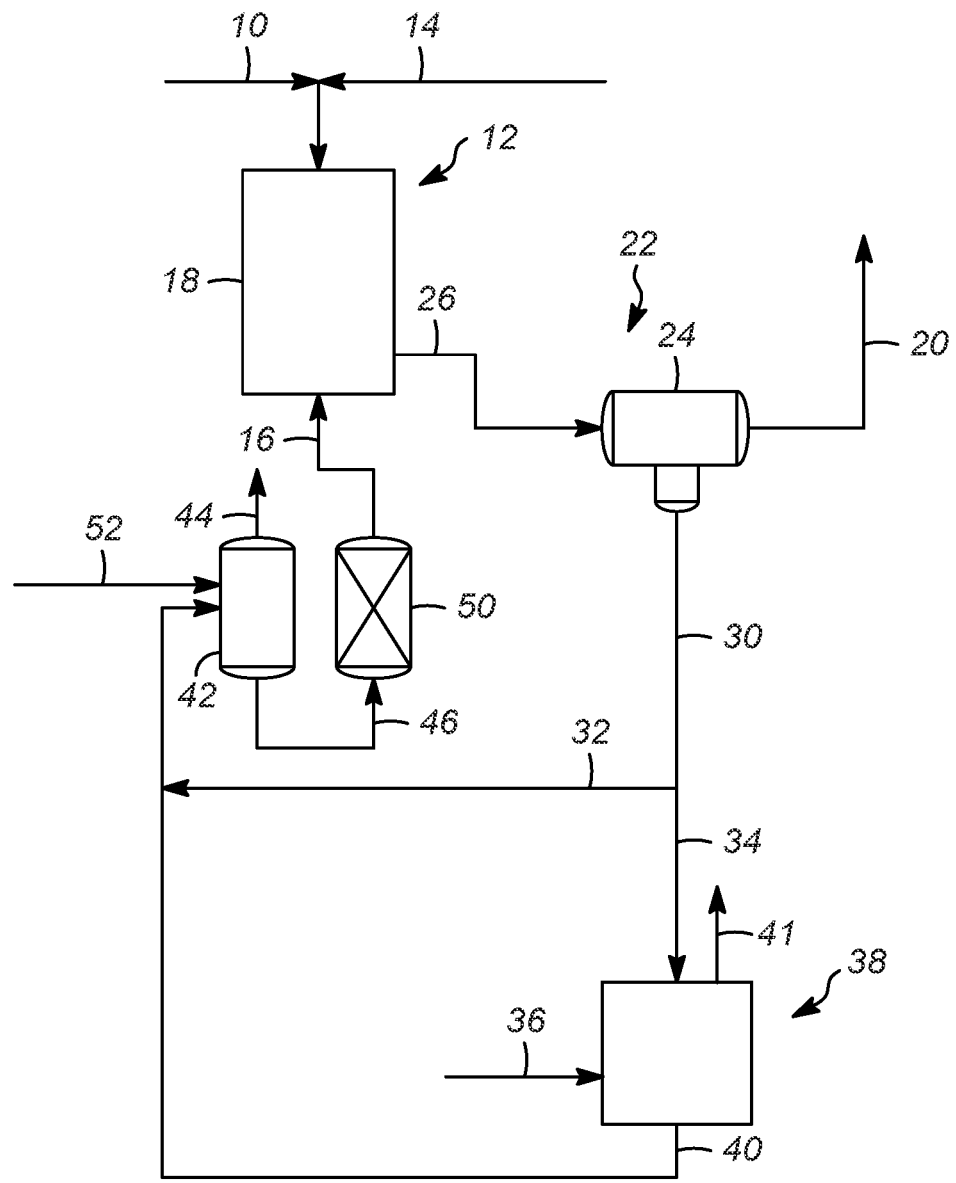
FIG. 1 shows a schematic process flow diagram of an ionic liquid alkylation process used in accordance with various aspects of the present invention.

Accordingly, with reference to FIG. 1, a hydrocarbon feed 10 is passed into a reaction zone 12. The hydrocarbon feed 10 typically includes a mixture of olefins, paraffins, and isoparaffins, and they may be separately added to the reaction zone 12 in one or more locations. Additionally, an isoparaffin stream 14 and an ionic liquid stream 16 are also passed to the reaction zone 12. The reaction zone 12 includes at least one reactor 18 for an alkylation reaction.

In general, the ionic liquid catalyzes a reaction between the olefin (from the hydrocarbon feed 10) with a paraffin (from the isoparaffin stream 14) to generate an alkylate. The paraffin used in the alkylation process preferably comprises an isoparaffin having from 4 to 10 carbon atoms, or 4 to 8 carbon atoms, or 4 to 5 carbon atoms. The olefin used in the alkylation process preferably has from 2 to 10 carbon atoms, or 3 to 8 carbon atoms, or 3 to 5 carbon atoms. Thus, the isoparaffin may have from 4 to 10 carbon atoms, and the olefin may have from 2 to 10 carbon atoms.

As shown in FIG. 1, an effluent 26, including hydrocarbon conversion products, ionic liquid, unconverted reactants, catalyst promoter such as hydrogen chloride, organic chlorides, or other compounds, is passed from the reaction zone 12 to a separation zone 22 having one or more separation vessels 24. In the separation vessel 24 of the separation zone 22, the effluent 26 separates into a hydrocarbon phase and an ionic liquid phase. This separation may be a phase separation as a result of the difference in the density of the hydrocarbon phase and the ionic liquid phase, although other methods could also be used, including for example, a coalescer material.

Accordingly, an alkylate effluent stream 20 from the separation zone 22 is sent to product recovery section (not shown). Further discussion of the product recovery section is not necessary for practicing the present invention.

A separated ionic liquid stream 30, which typically includes ionic liquid and some amount of conjunct polymer, is also recovered from the separation zone 22. As discussed in more detail below, a first portion 32 of the separated ionic liquid stream 30 may be recycled to the reaction zone 12 without regenerating the ionic liquid.

A second portion 34 of the separated ionic liquid stream 30 and a hydrogen containing gas 36 is passed to a regeneration zone 38 to remove at least some of the conjunct polymer from the separated ionic liquid catalyst in stream 34 and provide a regenerated ionic liquid stream 40. The split of the ionic liquid from separated ionic liquid stream 30 may be 70% (volume) sent back as the first portion 32, indirectly, to the reaction zone 12 and 30% (volume) sent as the second portion 34 to the regeneration zone 38.

The conjunct polymer is bound with the separated ionic liquid catalyst as an integrated compound. The conjunct polymer does not wash off from the separated ionic liquid catalyst via simple hydrocarbon solvent extraction. It is believed that the most efficient and effective process to reduce the conjunct polymer content in the separated ionic liquid catalyst is to convert the conjunct polymer species into extractable forms of hydrocarbons (i.e. light hydrocarbon gas or saturated hydrocarbon that is not very soluble in ionic liquid) and then separate or extract the hydrocarbons from the regenerated ionic liquid catalyst. During the regeneration process of the present invention, a portion of the conjunct polymer may be hydrocracked to a light material (C1-C4 hydrocarbons) which may be incorporated into an offgas stream 41. A portion may be hydrocracked to a liquid hydrocarbon stream which may be incorporated into the alkylate gasoline product, and/or a portion may be hydrocracked to HCl gas some of which may be in the offgas stream 41.

From the regeneration zone 38, a regenerated effluent 40 having ionic liquid with a reduced amount of conjunct polymer (as well as hydrogen and other light material) may be cooled and then passed, with the first portion 32 of the separated ionic liquid stream, to a vessel 42 which may be a surge drum, the regenerated effluent may be separated into a liquid phase including at least regenerated ionic liquid and a vapor phase including hydrogen and hydrogen chloride. Depending on the operating pressure of the regeneration zone, 44 may or may not be recovered from the vessel 42. Regardless of the pressure, a stream of regenerated ionic liquid 46 is recovered from the vessel 42. The regenerated ionic liquid 46 may pass through a guard bed 50 and then passed back to the reaction zone 12. A stream of fresh ionic liquid 52 may be added, for example, into the vessel 42.

Figure 2:
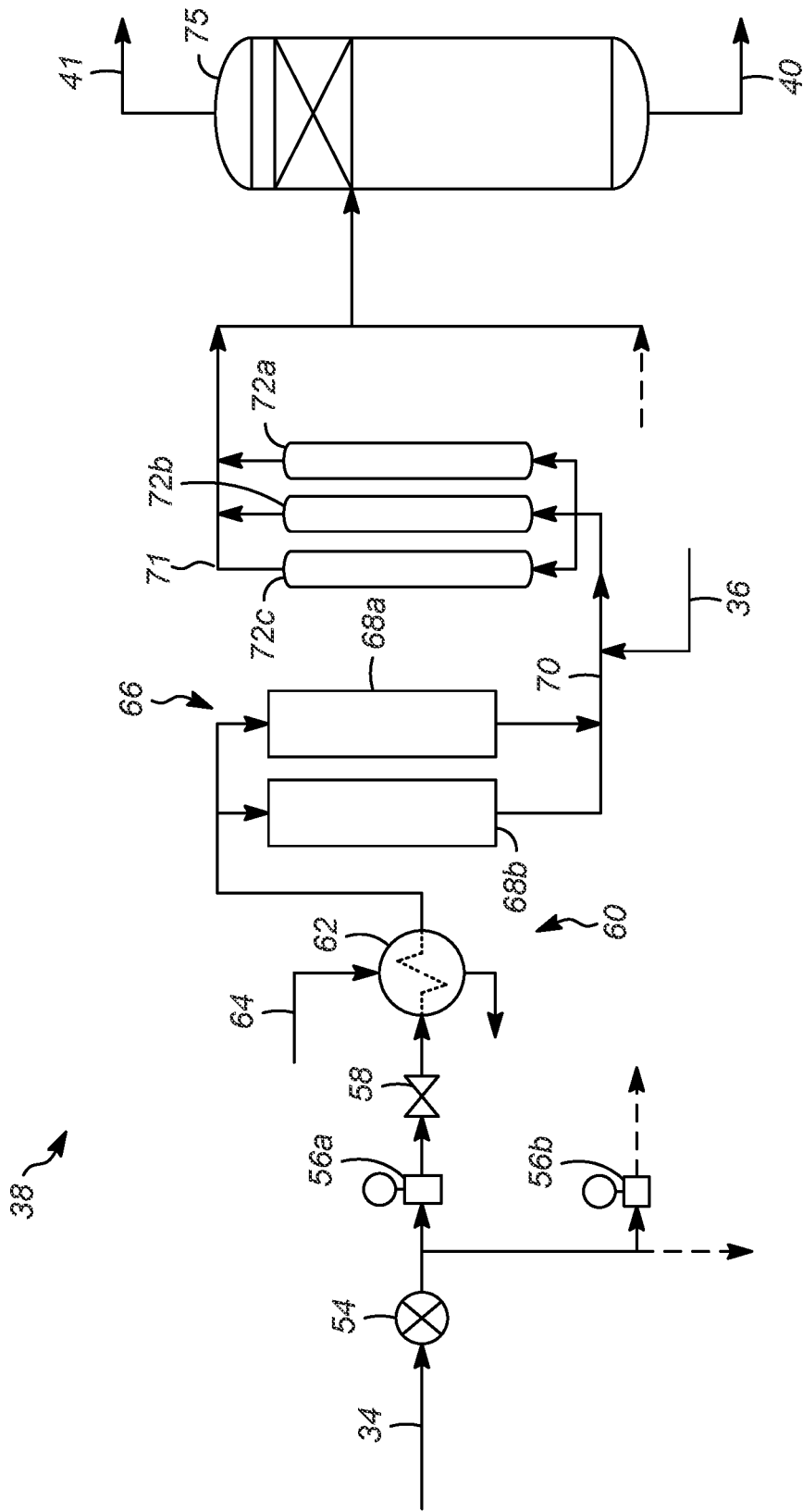
FIG. 2 shows a schematic process flow diagram of the regeneration zone shown in FIG. 1.

Turning to FIG. 2, the regeneration zone 38 is shown in more detail in which the various components form a system for regenerating ionic liquid in the presence of solid regeneration catalyst and hydrogen. Specifically, in the regeneration zone 38, the separated ionic liquid 34 may be passed through a charge pump 54 to increase the pressure of the stream. Flow control indicators 56a, 56b and a valve 58 may be utilized to ensure appropriate pressure is achieved, preferably in a range between 1,380 to 10,342 kPag (200 to 1,500 psig).

The separated ionic liquid may then be passed to a heating zone 60 having, for example, a heat exchanger 62 to increase the temperature with a heating fluid 64, preferably to a temperature in a range between 93 to 288° C. (200 to 550° F.).

From the heating zone 60, the separated ionic liquid may be passed to a pretreatment zone 66. In the embodiment of FIG. 2, the pretreatment zone 66 comprises two vessels 68a, 68b that are arranged in parallel, with a downward flow. This arrangement is merely exemplary and other arrangements, flow directions, and numbers of vessels may be used. For example, one or more of the vessels 68a, 68b may be arranged for an up flow. The vessels 68a, 68b include a solid active particulate material for removing contaminants in the separated ionic liquid, such as metal chloride, which would otherwise contaminate the regeneration catalyst. Exemplary materials include hydrotreating guard bed materials or Cat-Trap materials.

Figure 3:
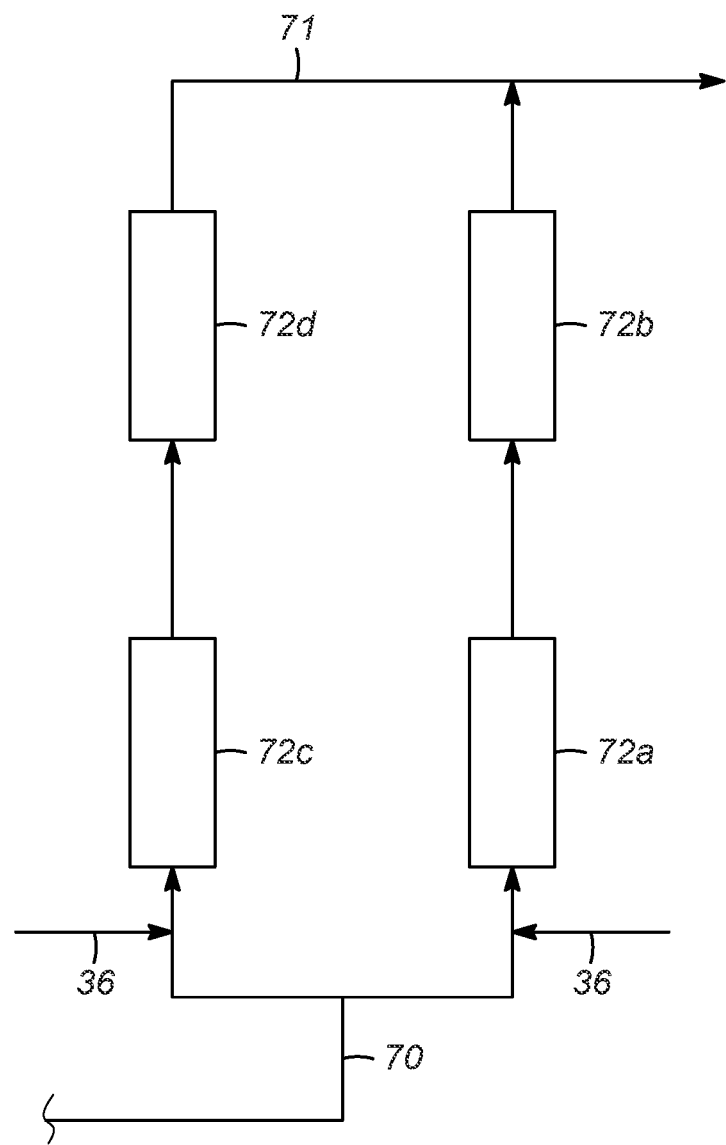
FIG. 3 shows a schematic process flow diagram of an alternative arrangement of regeneration reactors according to aspects of the present invention.

From the pretreatment zone 66, an effluent of treated separated ionic liquid in line 70 may be combined with the hydrogen containing gas 36 and passed to one or more regeneration reactors 72a, 72b, 72c. In FIG. 2, three regeneration reactors 72a, 72b, 72c are arranged in parallel. In FIG. 3, another arrangement is shown in which four regeneration reactors 72a, 72b, 72c, 72d are shown. The four reactors 72a, 72b, 72c, 72d are arranged in two parallel sets, and within each set the reactors are arranged in series. For example, one set includes reactors 72a, 72b and the second set includes reactors 72c, 72d. Within these sets, the ionic liquid flows from the first reactor 72a, 72c to the second reactor 72b, 72d. The lines, or piping arrangement, with the various streams supplying ionic liquid and hydrogen to the reactors in parallel should be arranged and configured to supply equal flow between the two parallel trains of reactors 72a, 72b, 72c, 72d. These arrangements are merely exemplary and other configurations may be utilized.

As shown in FIGS. 2 and 3, a reactor effluent 71 containing regenerated ionic liquid and hydrogen gas may be combined with the effluent from other parallel trains of the regeneration system and passed to a separation vessel 75, which may be a flash drum. Returning to FIG. 2, the regenerated ionic liquid 40 in the separation vessel 75 is separated from the hydrogen gas 41 and leaves the regeneration zone 38 and is sent to the vessel 42 to be combined with the first portion 32 of the separated ionic liquid stream 30 to be prepared to be passed to the reaction zone 12. See, FIG. 1. The separated hydrogen gas 41 may be recycled to a compressor system, not shown.

Within each reactor is solid active particulate material which may be one or more solid regeneration catalysts. Exemplary regeneration catalysts are disclosed in U.S. Pat. Nos. 7,651,970, 7,691,771, and 7,825,055.

Suitable temperatures of an operating temperature of each of the regeneration reactors 72a, 72b, 72c, 72d are between approximately 93 to 288° C. (200 to 550° F.). Additionally, suitable operating pressures of the regeneration reactors 72a, 72b, 72c, 72d are between approximately 1,380 to 10,342 kPag (200 to 1,500 psig), however greater pressures may be used.

Figure 4:
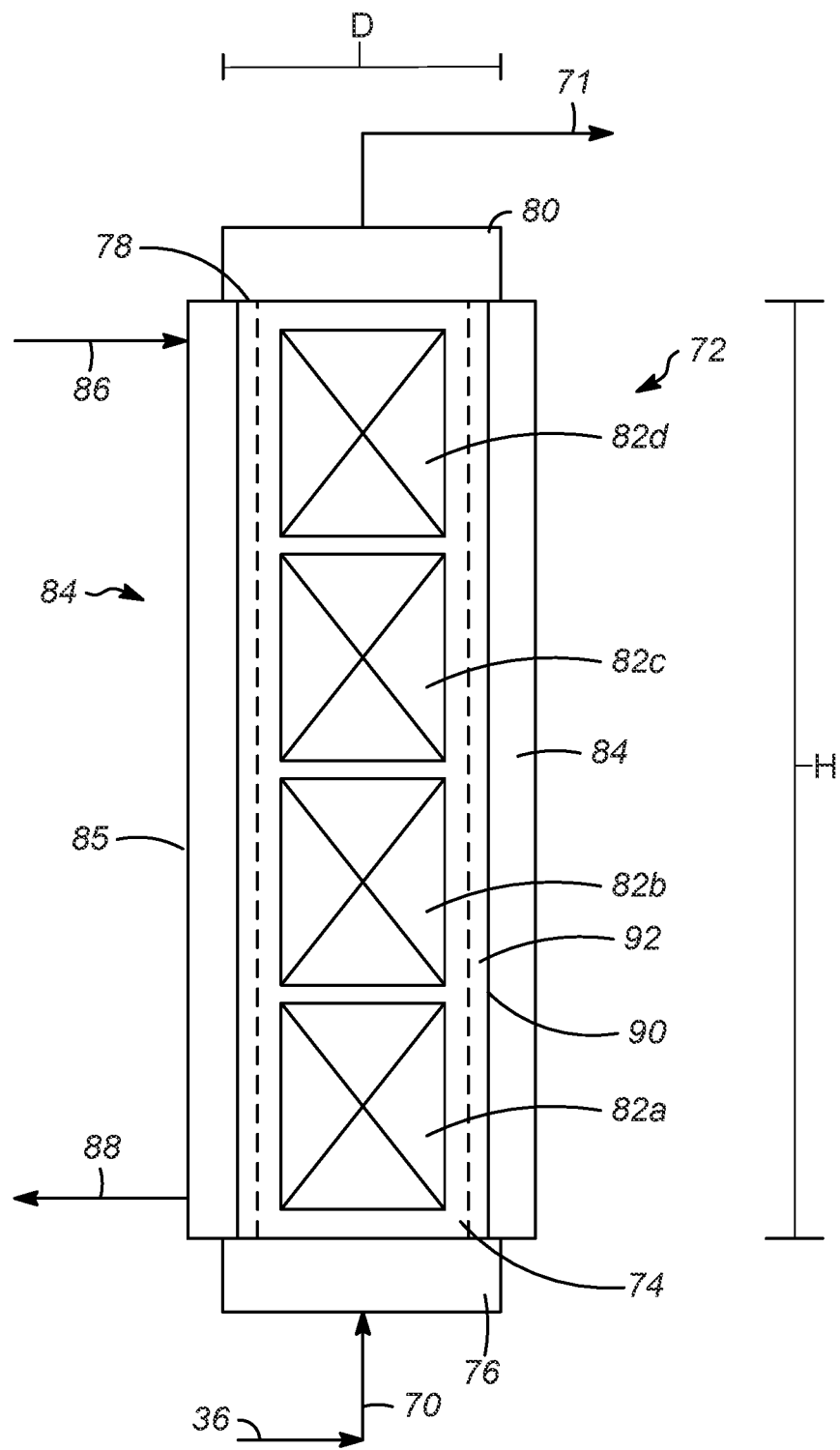
FIG. 4 shows a schematic side cutaway view of a tubular reactor in accordance with one or more aspects of the present invention; and, FIG. 5 shows a schematic view of a tubular reactor in accordance with one or more aspects of the present invention.

Turning to FIG. 4, a more detailed regeneration reactor 72 according to the present invention is depicted. The regeneration reactor 72 is a tubular reactor, having a substantially constant diameter D over its height H. Preferably, the reactor 72 has a height H between about 1.5 to 30.5 m (5 to 100 feet) and a diameter D between about 25 to 305 cm (10 to 120 inches). The higher reaction rate constant, achieved with the presence of regeneration catalyst, requires less overall volume in the regeneration reactors, and allows for the present reactors 72 to be utilized which are generally smaller compared with those in conventional systems. The ability to use a smaller regeneration reactor 72, lowers the inventory or amount of ionic liquid that is required for a system as compared to other proposed systems without catalyst.

In one embodiment of the present system as shown in FIG. 4, the reactor 72 has a first end 74 secured to an inlet coupling 76 which receives separated ionic liquid via stream 70 and hydrogen via stream 36, injected upstream of reactor 72. An inlet distributor (not shown) may be used to distribute the two-phase flow within the reactor 72. A second end 78 of the reactor 72, opposite the first end 74, is secured to an outlet coupling 80 which is provides regenerated ionic liquid, along with hydrogen, in stream 71. In the depicted arrangement, the tubular reactor 72 is vertically orientated (longitudinal axis extends vertically). Additionally, the hydrogen flow within the reactor 72 shown in FIG. 4 will be co-current with the flow of ionic liquid from the bottom (first end 74) to the top (second end 78).

Figure 5:
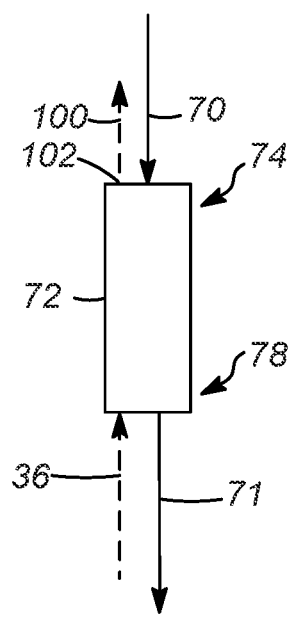

It is contemplated that the flow through the reactor 72 could be counter-current, as shown in FIG. 5, in which the first end 74 is located at the top of the reactor 72 and the second end 78 is located at the bottom of the reactor 72. Thus, the ionic liquid flows from the top (first end 74) to the bottom (second end 78), while the hydrogen gas 36 may be injected near the second end 78 at the bottom and flow upward to be recovered in a stream 100 from an outlet 102. Alternatively, instead of the counter current arrangement (as shown in FIG. 5), it is contemplated that the hydrogen gas could, instead, be mixed with the separated ionic liquid in line 70 and flow downward, or co-current, with the ionic liquid.

Returning to FIG. 4, between the first end 74 and the second end 78, as noted above, are beds 82a 82b, 82c, 82d of catalyst material configured to remove conjunct polymer from the ionic liquid. In some embodiments, the different beds 82a 82b, 82c, 82d may each contain a different material. Further it is also contemplated that at least one of the beds 82a 82b, 82c, 82d, preferably the first bed 82a, includes the pretreatment materials contained in the vessels 68a, 68b of the pretreatment zone 66 (see, FIG. 2). In such cases, the pretreatment zone 66 may located in the reactor 72.

It is contemplated that heat may need to be supplied to the fluids in the tubular reactor 72. Accordingly, in FIG. 4, the tubular reactor 72 is at least partially surrounded by a heat exchanger 84, such as a jacket 85, configured to supply heat to fluids within the tubular reactor 72. The jacket 85 includes an inlet 86 for a heat transfer fluid, like steam, and an outlet 88 for cooled heat transfer fluid, like condensate. The inlet 86 may be located closer to the second end 78 of the tubular reactor 72 than to the first end 74. As will be appreciated, heat, from the steam in the jacket 85, is absorbed by fluids in the reactor 72. It should be appreciated that steam is merely an exemplary heat transfer fluid, and other fluids like hot paraffinic oil, molten salt, hydrocarbons with high boiling points (diesel, kerosene, etc.) may be used. Additionally, the depicted jacket 85 is merely exemplary, and other heat exchangers 84 or heat transfer and heat maintenance technologies like ContraTrace, jacketed pipe, electric tracing, steam tracing, and circulating hot heat transfer fluid circuits may be used.

All or portion of the tubular reactor 72 may be made from a metal or metal alloy material, such as carbon steel, corrosion resistant metal lined, or solid corrosion resistant metal like a nickel alloy such as nickel-chromium-molybdenum alloys, nickel-iron-chromium or some elemental metals in order to further ensure that the materials of the reactor 72 do not react with the ionic liquid. Accordingly, at least an inner surface 90 of the tubular reactor 72 may be made from a metal or metal alloy such as the foregoing ones that are resistant to corrosion from ionic liquid. Alternatively, in order to further ensure that the materials of the reactor 72 do not react with the ionic liquid, an inner surface 90 of the tubular reactor 72 may be lined with a protective lining 92 comprising fluoropolymer materials, such as polytetrafluoroethylene (PTFE) or perfluoroalkoxy alkanes (PKA), or co-polymers of same, fiberglass, epoxy coating, phenolic coating, and, mixtures thereof. Additionally, the lines, piping, and streams from the regeneration zone 38 may be similarly protected with metal or metal alloys or a protective lining.

In a preferred configuration, the tubular reactors 72 are modular and configured to be removed and replaced by another modular reactor 72. In other words, by modular, it is meant that when the catalyst in the beds 82a 82b, 82c, 82d are to be replaced, the entire reactor 72 is removed, for example, by decoupling from the inlet and outlet couplings 76, 80, and a new reactor 72 (with fresh or regenerated and fully activated catalyst) may be installed in its place. If operated with a redundant parallel stream, this configuration is believed to avoid a shutdown when the catalyst or guard material is replaced. Additionally, it provides catalyst that does not need to be activated at site, and it does not require a refiner to handle the catalyst.

Although the foregoing description focused on the reactors 72, it should be appreciated that the same description applies to the vessels 68a, 68b in the pretreatment zone 66 (see, FIG. 2).

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention. As depicted, process flow lines in the figures can be referred to interchangeably as, e.g., lines, pipes, feeds, effluents, products, or streams.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a system for regenerating ionic liquid with solid regeneration catalyst and hydrogen, the system comprising a plurality of tubular reactors, each tubular reactor having a first end and a second end opposite the first end, each tubular reactor comprising a metal material, and each tubular reactor orientated vertically; a first line configured to supply separated ionic liquid to the first ends of the tubular reactors of the plurality of tubular reactors; a solid active particulate material disposed in each of the tubular reactors; a second line configured to recover an effluent from the second ends of the tubular reactors of the plurality of tubular reactors; and, a piping arrangement connecting the plurality of tubular reactors. An embodiment of the invention is one, any or all of prior embodiments in this paragraph up through the first embodiment in this paragraph, wherein each of the tubular reactors of the plurality of tubular reactors are modular and configured to be removed from the system and replaced by another tubular reactor. An embodiment of the invention is one, any or all of prior embodiments in this paragraph up through the first embodiment in this paragraph, wherein the tubular reactors of the plurality of tubular reactors are arranged so that system continues to operate when one or more of the tubular reactors of the plurality of tubular reactors are taken offline. An embodiment of the invention is one, any or all of prior embodiments in this paragraph up through the first embodiment in this paragraph, wherein the tubular reactors of the plurality of tubular reactors are arranged in series. An embodiment of the invention is one, any or all of prior embodiments in this paragraph up through the first embodiment in this paragraph, wherein the tubular reactors of the plurality of tubular reactors are arranged in parallel. An embodiment of the invention is one, any or all of prior embodiments in this paragraph up through the first embodiment in this paragraph, wherein the tubular reactors of the plurality of tubular reactors include tubular reactors arranged in series and tubular reactors arranged in parallel. An embodiment of the invention is one, any or all of prior embodiments in this paragraph up through the first embodiment in this paragraph further comprising a piping arrangement configured to supply equal flow to the tubular reactors arranged in parallel. An embodiment of the invention is one, any or all of prior embodiments in this paragraph up through the first embodiment in this paragraph, wherein each of the tubular reactors further comprises an inner lining formed from a material that is non-reactive with ionic liquid. An embodiment of the invention is one, any or all of prior embodiments in this paragraph up through the first embodiment in this paragraph, wherein the material of the inner lining is selected from the group consisting of fluoropolymer, fiberglass, epoxy coating, phenolic coating, and, mixtures thereof. An embodiment of the invention is one, any or all of prior embodiments in this paragraph up through the first embodiment in this paragraph, wherein an inner surface of each of the tubular reactors comprises a metal or metal alloy that resistant to corrosion from ionic liquid. An embodiment of the invention is one, any or all of prior embodiments in this paragraph up through the first embodiment in this paragraph, wherein the solid active particulate material disposed in at least one tubular reactor from the plurality of tubular reactors comprises a pretreat catalyst material configured to treat the ionic liquid, with or without the presence of hydrogen. An embodiment of the invention is one, any or all of prior embodiments in this paragraph up through the first embodiment in this paragraph, wherein the at least one tubular reactor having the pretreat catalyst material comprises a plurality of pretreat catalyst materials. An embodiment of the invention is one, any or all of prior embodiments in this paragraph up through the first embodiment in this paragraph, wherein the solid active particulate material disposed in at least one tubular reactor from the plurality of tubular reactors comprises the solid regeneration catalyst. An embodiment of the invention is one, any or all of prior embodiments in this paragraph up through the first embodiment in this paragraph, wherein the at least one tubular reactor having the solid regeneration catalyst comprises a plurality of solid regeneration catalysts. An embodiment of the invention is one, any or all of prior embodiments in this paragraph up through the first embodiment in this paragraph, wherein the first ends of the tubular reactors are at bottoms of the tubular reactors and the second ends of the tubular reactors are at tops of the tubular reactors. An embodiment of the invention is one, any or all of prior embodiments in this paragraph up through the first embodiment in this paragraph, wherein hydrogen is injected at the first ends of the tubular reactors and is recovered in the second line. An embodiment of the invention is one, any or all of prior embodiments in this paragraph up through the first embodiment in this paragraph, wherein the first ends of the tubular reactors are at tops of the tubular reactors and the second ends of the tubular reactors are at bottoms of the tubular reactors. An embodiment of the invention is one, any or all of prior embodiments in this paragraph up through the first embodiment in this paragraph, wherein hydrogen is injected at the second ends of the tubular reactors and is recovered in separate outlets at the first ends of each of the tubular reactors. An embodiment of the invention is one, any or all of prior embodiments in this paragraph up through the first embodiment in this paragraph, further comprising a heat exchanger configured to supply heat to fluid within the tubular reactors. An embodiment of the invention is one, any or all of prior embodiments in this paragraph up through the first embodiment in this paragraph, wherein each tubular reactor comprises a height between 1.5 to 30.4 meters (5 to 100 feet) and a diameter between 25.4 to 305 centimeters (10 to 120 inches).

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for regenerating ionic liquid with solid regeneration catalyst and hydrogen, the system comprising:
    a plurality of tubular reactors, each tubular reactor having a first end secured to an inlet coupling and a second end opposite the first end and secured to an outlet coupling, each tubular reactor comprising a metal material, and each tubular reactor orientated vertically;

a first line configured to supply separated ionic liquid to the first ends of the tubular reactors of the plurality of tubular reactors;

a solid active particulate material disposed in each of the tubular reactors;

a second line configured to recover an effluent from the second ends of the tubular reactors of the plurality of tubular reactors; and, a piping arrangement connecting the plurality of tubular reactors, wherein each of the tubular reactors of the plurality of tubular reactors are modular and configured to be removed from the system, by decoupling from the inlet and outlet couplings, and replaced by another tubular reactor.

2. The system of claim 1, wherein the tubular reactors of the plurality of tubular reactors are arranged so that system continues to operate when one or more of the tubular reactors of the plurality of tubular reactors are taken offline.

3. The system of claim 1, wherein the tubular reactors of the plurality of tubular reactors are arranged in series.

4. The system of claim 1, wherein the tubular reactors of the plurality of tubular reactors are arranged in parallel.

5. The system of claim 1, wherein the tubular reactors of the plurality of tubular reactors include tubular reactors arranged in series and tubular reactors arranged in parallel.

6. The system of claim 5 wherein the piping arrangement is configured to supply equal flow to the tubular reactors arranged in parallel.

7. The system of claim 1, wherein each of the tubular reactors further comprises an inner lining formed from a material that is non-reactive with ionic liquid.

8. The system of claim 7, wherein the material of the inner lining is selected from the group consisting of: fluoropolymer, fiberglass, epoxy coating, phenolic coating, and, mixtures thereof.

9. The system of claim 1, wherein an inner surface of each of the tubular reactors comprises a metal or metal alloy that is resistant to corrosion from ionic liquid.

10. The system of claim 1, wherein the solid active particulate material disposed in at least one tubular reactor from the plurality of tubular reactors comprises a pretreat catalyst material configured to treat the ionic liquid, with or without the presence of hydrogen.

11. The system of claim 10, wherein the at least one tubular reactor having the pretreat catalyst material comprises a plurality of pretreat catalyst materials.

12. The system of claim 1, wherein the solid active particulate material disposed in at least one tubular reactor from the plurality of tubular reactors comprises the solid regeneration catalyst.

13. The system of claim 12, wherein the at least one tubular reactor having the solid regeneration catalyst comprises a plurality of solid regeneration catalysts.

14. The system of claim 1, wherein the first ends of the tubular reactors are at bottoms of the tubular reactors and the second ends of the tubular reactors are at tops of the tubular reactors, and wherein hydrogen is injected at the first ends of the tubular reactors and is recovered in the second line.

15. The system of claim 1, wherein the first ends of the tubular reactors are at tops of the tubular reactors and the second ends of the tubular reactors are at bottoms of the tubular reactors, and wherein hydrogen is injected at the second ends of the tubular reactors and is recovered in separate outlets at the first ends of each of the tubular reactors.

16. The system of claim 1, further comprising:
a heat exchanger configured to supply heat to fluid within the tubular reactors.

17. The system of claim 1, wherein each tubular reactor comprises a height between 1.5 to 30.4 meters (5 to 100 feet) and a diameter between 25.4 to 305 centimeters (10 to 120 inches).

18. A system for regenerating ionic liquid with solid regeneration catalyst and hydrogen, the system comprising:
a plurality of tubular reactors, each tubular reactor having a first end secured to an inlet coupling and a second end opposite the first end and secured to an outlet coupling, each tubular reactor comprising a metal material, and each tubular reactor orientated vertically;

a first line configured to supply separated ionic liquid to the first ends of the tubular reactors of the plurality of tubular reactors;

a solid active particulate material disposed in each of the tubular reactors;

a second line configured to recover an effluent from the second ends of the tubular reactors of the plurality of tubular reactors; and, a piping arrangement connecting the plurality of tubular reactors, wherein the tubular reactors of the plurality of tubular reactors are arranged so that system continues to operate when one or more of the tubular reactors of the plurality of tubular reactors are taken offline, wherein the first ends of the tubular reactors are at bottoms of the tubular reactors and the second ends of the tubular reactors are at tops of the tubular reactors, wherein hydrogen is injected at the first ends of the tubular reactors and is recovered in the second line, and wherein each of the tubular reactors of the plurality of tubular reactors are modular and configured to be removed from the system, by decoupling from the inlet and outlet couplings, and replaced by another tubular reactor.

19. A system for regenerating ionic liquid with solid regeneration catalyst and hydrogen, the system comprising:
a plurality of tubular reactors, each tubular reactor having a first end secured to an inlet coupling and a second end opposite the first end and secured to an outlet coupling, each tubular reactor comprising a metal material, and each tubular reactor orientated vertically;

a first line configured to supply separated ionic liquid to the first ends of the tubular reactors of the plurality of tubular reactors;

a solid active particulate material disposed in each of the tubular reactors;

a second line configured to recover an effluent from the second ends of the tubular reactors of the plurality of tubular reactors; and, a piping arrangement connecting the plurality of tubular reactors, wherein the tubular reactors of the plurality of tubular reactors are arranged so that system continues to operate when one or more of the tubular reactors of the plurality of tubular reactors are taken offline, wherein the first ends of the tubular reactors are at tops of the tubular reactors and the second ends of the tubular reactors are at bottoms of the tubular reactors, wherein hydrogen is injected at the second ends of the tubular reactors and is recovered in separate outlets at the first ends of each of the tubular reactors, and wherein each of the tubular reactors of the plurality of tubular reactors are modular and configured to be removed from the system, by decoupling from the inlet and outlet couplings, and replaced by another tubular reactor.

* * * * *